United States Patent
Okubo

(10) Patent No.: US 10,277,800 B2
(45) Date of Patent: Apr. 30, 2019

(54) IMAGE PICKUP APPARATUS WITH FOCUS DETECTION TECHNIQUE, CONTROL METHOD THEREFOR, AND STORAGE MEDIUM

(71) Applicant: CANON KABUSHIKI KAISHA, Tokyo (JP)

(72) Inventor: Toshiyuki Okubo, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 15/658,446

(22) Filed: Jul. 25, 2017

(65) Prior Publication Data
US 2018/0035040 A1 Feb. 1, 2018

(30) Foreign Application Priority Data
Jul. 29, 2016 (JP) .................. 2016-149848

(51) Int. Cl.
*H04N 5/232* (2006.01)
*H04N 5/345* (2011.01)
*H04N 5/365* (2011.01)
*H04N 5/347* (2011.01)

(52) U.S. Cl.
CPC ..... *H04N 5/23212* (2013.01); *H04N 5/23232* (2013.01); *H04N 5/345* (2013.01); *H04N 5/347* (2013.01); *H04N 5/3656* (2013.01)

(58) Field of Classification Search
CPC .......... H04N 5/23212; H04N 5/23232; H04N 5/345; H04N 5/347; H04N 5/3656
See application file for complete search history.

(56) References Cited

U.S. PATENT DOCUMENTS

| | | | |
|---|---|---|---|
| 6,819,360 B1* | 11/2004 | Ide | H01L 27/14627 |
| | | | 257/E27.131 |
| 7,920,781 B2 | 4/2011 | Onuki | |
| 8,773,560 B2* | 7/2014 | Okita | H04N 5/335 |
| | | | 348/301 |
| 8,928,791 B2* | 1/2015 | Okita | H04N 5/335 |
| | | | 348/301 |
| 10,033,950 B2* | 7/2018 | Ishibashi | G02B 7/34 |

(Continued)

FOREIGN PATENT DOCUMENTS

JP 2009003122 A 1/2009

*Primary Examiner* — Antoinette T Spinks
(74) *Attorney, Agent, or Firm* — Rossi, Kimms & McDowell LLP

(57) ABSTRACT

An image pickup apparatus which, when performing image-plane phase-difference AF, eliminate a noise difference in phase difference information obtained based on signals read from pupil-dividing pixels of an image pickup device, which are arranged in rows and columns in a two-dimensional form. A first image signal is read from one pixel of each pupil-dividing pixels, and a second image signal is read from the other pixel. The order in which they are read is alternately switched on a row-by-row basis. Each of the first and second image signals is subtracted from a third image signal, which is a sum of the first image signal and the second image signal, to obtain first and second separated image signals. The first image signal and the first separated image signal are added together, and the second image signal and the second separated image signal are added together in the column direction.

8 Claims, 8 Drawing Sheets

(56) References Cited

U.S. PATENT DOCUMENTS

| | | | |
|---|---|---|---|
| 2013/0120624 A1* | 5/2013 | Okita | H04N 5/335 |
| | | | 348/300 |
| 2014/0253771 A1* | 9/2014 | Okita | H04N 5/335 |
| | | | 348/301 |
| 2016/0094778 A1* | 3/2016 | Okubo | H04N 5/23212 |
| | | | 348/349 |
| 2017/0064226 A1* | 3/2017 | Ishii | H04N 5/361 |
| 2017/0359539 A1* | 12/2017 | Kawabata | G02B 7/34 |

* cited by examiner

DIRECTION IN WHICH PIXELS ARE ARRANGED

| ISO \ TEMPERATURE | 30°C OR LOWER | HIGHER THAN 30°C |
|---|---|---|
| 100 | NO SWITCHING | PERFORM SWITCHING EVERY 4 ROWS |
| 400 | PERFORM SWITCHING EVERY 4 ROWS | PERFORM SWITCHING EVERY ROW |
| 1600 | PERFORM SWITCHING EVERY ROW | PERFORM SWITCHING EVERY 4 ROWS |

IMAGE PICKUP APPARATUS WITH FOCUS DETECTION TECHNIQUE, CONTROL METHOD THEREFOR, AND STORAGE MEDIUM

BACKGROUND OF THE INVENTION

Field of the Invention

The present invention relates to an image pickup apparatus such as a digital camera or a digital video camera, a control method therefor, and a storage medium, and in particular to improvements in focus detection technique for an image pickup apparatus equipped with an image pickup device having pupil-dividing pixels.

Description of the Related Art

Some image pickup apparatuses such as a digital camera use, as an auto-focusing (AF) system, an image-plane phase-difference AF system that performs focus detection by finding an amount of defocus from a difference between outputs from pupil-dividing pixels of an image pickup device. The image-plane phase-difference AF system has an advantage because the time required for focus detection is very short as compared to a contrast AF system since an amount of defocus is found from an image of one frame.

There has been proposed a technique to obtain a focus detection signal based on signals read out from respective ones of a plurality of photoelectrical conversion units provided in each one of focus detection pixels which an image pickup device has (Japanese Laid-Open Patent Publication (Kokai) No. 2009-3122). According to this proposal, first, a signal A is independently read out from a part of the plurality of photoelectrical conversion units, and next, a signal A+B which is a sum of the signal A and a signal B in the plurality of photoelectrical conversion units is read out. Then, a value of the signal B in a remaining part of the plurality of photoelectrical conversion units, which was not read out first, is obtained by subtracting the signal A from the signal A+B.

According to Japanese Laid-Open Patent Publication (Kokai) No. 2009-3122 above, however, noise in the value of the signal B obtained by subtracting the signal A from the signal A+B is higher than noise in the value of the signal A independently read out from a part of the plurality of photoelectrical conversion units, causing a noise difference in phase difference information. This presents a problem of degradation in focus detection performance at the time of shooting in, for example, a low-brightness scene.

SUMMARY OF THE INVENTION

The present invention provides an image pickup apparatus and a control method therefor which use a focus detection technique to, when performing image-plane phase-difference AF, eliminate a noise difference in phase difference information obtained based on signals read out from pupil-dividing pixels of an image pickup device, as well as a storage medium.

Accordingly, the present invention provides an image pickup apparatus comprising an image pickup device configured to comprise a plurality of pupil-dividing pixels arranged in rows and columns in a two-dimensional form, a readout unit configured to read out a first image signal from one pixel of each of the pupil-dividing pixel, read out a second image signal from the other pixel, and read out a third image signal obtained by adding the first image signal and the second image signal by the image pickup device, a switching unit configured to alternately switch, on a row-by-row basis, an order in which the first image signal and the second image signal are read out by the readout unit, a subtraction unit configured to subtract each of the first image signal and the second image signal from the third image signal to obtain a first separated image signal and a second separated image signal, respectively, separated from the third image signal, and a summation unit configured to add the first image signal read out by the readout unit and the first separated image signal obtained by the subtraction unit together in the column direction and add the second image signal read out by the readout unit and the second separated image signal obtained by the subtraction unit together in the column direction.

According to the present invention, when performing image-plane phase-difference AF is to be performed, it is possible to eliminate a noise difference in phase difference information obtained based on signals read out from the pupil-dividing pixels of the image pickup device.

Further features of the present invention will become apparent from the following description of exemplary embodiments (with reference to the attached drawings).

DESCRIPTION OF THE EMBODIMENTS

Hereafter, an exemplary embodiment of the present invention will be described with reference to the drawings.

Figure 1:
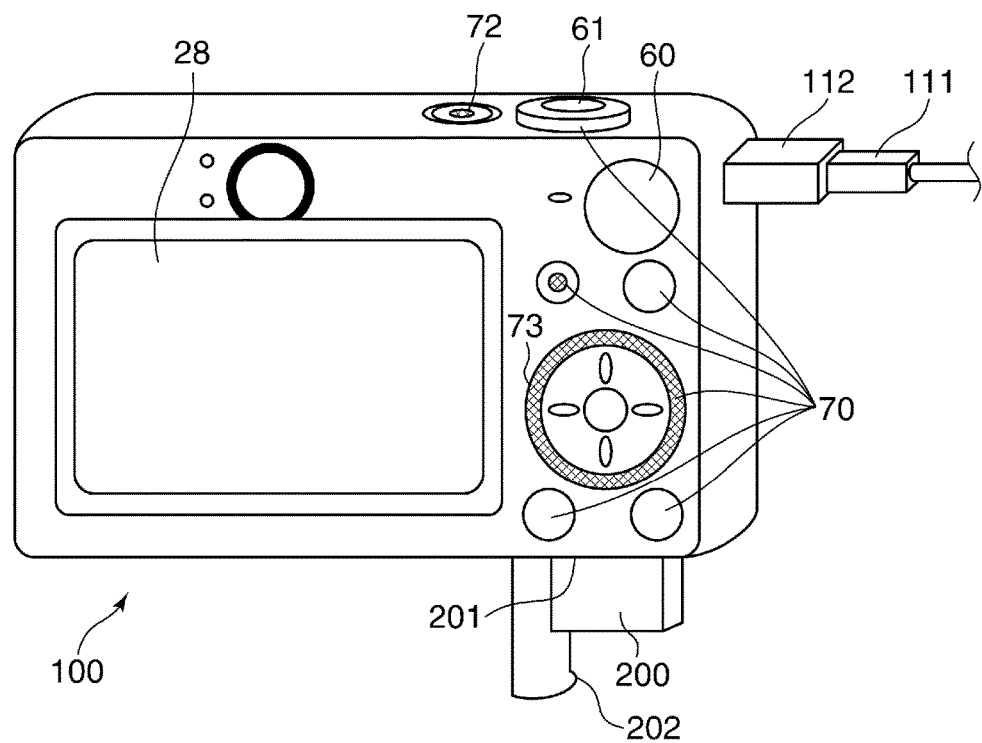
FIG. 1 is a perspective view showing a digital camera, which is an exemplary embodiment of an image pickup apparatus according to the present invention, as seen from behind.

FIG. 1 is a perspective view showing a digital camera, which is an exemplary embodiment of an image pickup apparatus according to the present invention, as seen from behind.

As shown in FIG. 1, the digital camera 100 (hereafter referred to as the camera 100) according to the present embodiment has, on a rear side thereof, a display unit 28 such as an LCD which displays images and a variety of information. A mode selector switch 60, a controller wheel 73, and an operating unit 70, which is comprised of operating members such as a variety of switches, buttons, and a touch panel that receive a variety of operations are provided in a side portion of the display unit 28 on the rear side of the camera 100. A taking lens 103, a lens barrier 102, and so forth (see FIG. 2), to be described later, are provided on a front side of the camera 100.

A release button 61, a power switch 72, and so forth are provided on a top side of the camera 100, and a connector 112 is provided on a side of the camera 100. Connected to the connector 112 is a cable 111, which connects an external device to the camera 100 such that they are able to communicate with each other. A slot portion 201, into which a recording medium 200 such as a memory card is removably inserted, is provided on a bottom of the camera 100, and the slot portion 201 is covered with a lid portion 202 such that it is able to open and close.

Figure 2:
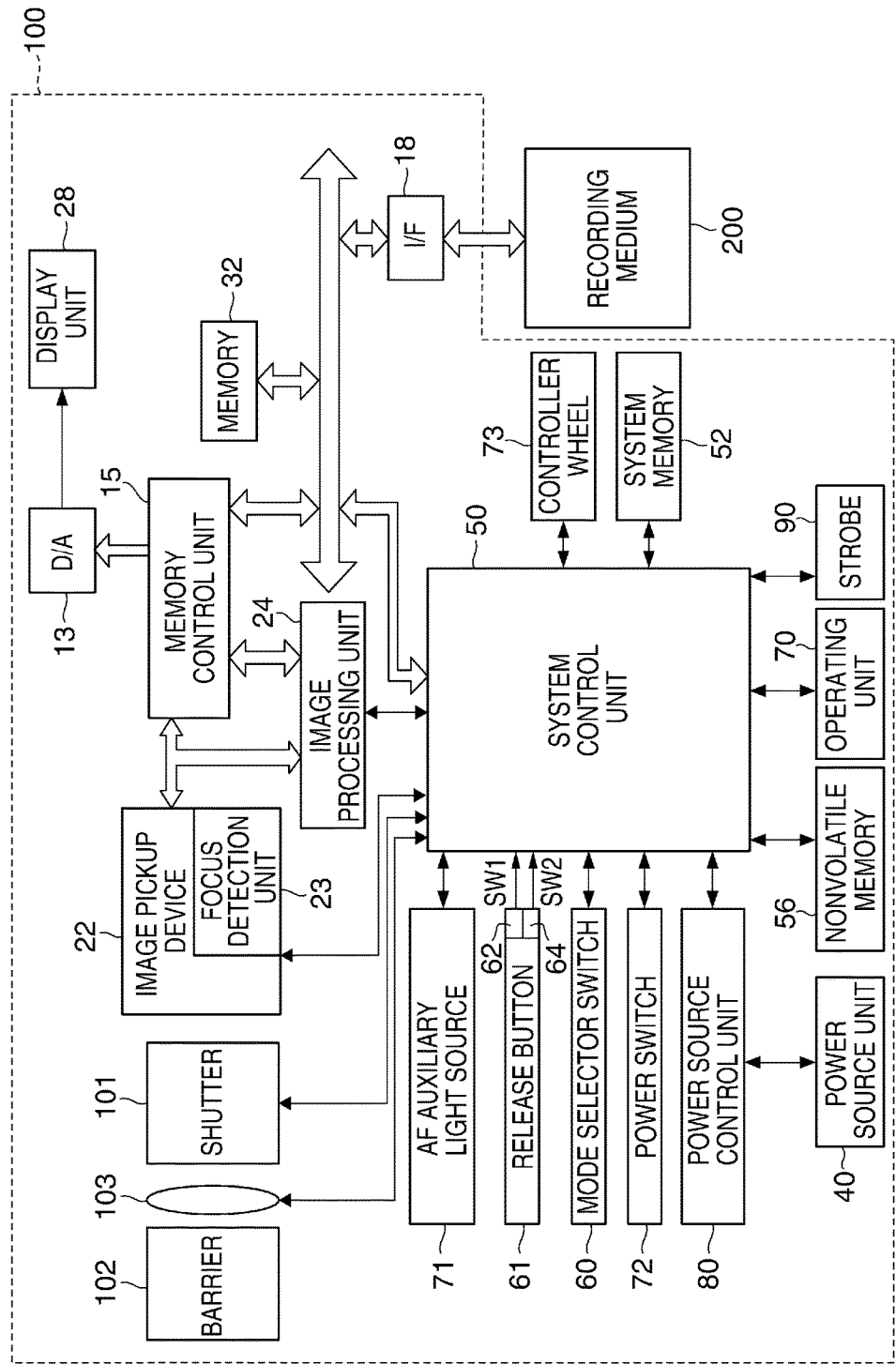
FIG. 2 is a block diagram useful in explaining a control system of the digital camera in FIG. 1.

FIG. 2 is a block diagram useful in explaining a control system of the camera 100 in FIG. 1. Referring to FIG. 2, the taking lens 103 is comprised of a lens group including a zoom lens and a focus lens. An image pickup device 22, which is comprised of a CCD sensor, a CMOS sensor, or the like, photoelectrically converts a subject image, which has been formed through the taking lens 103, into an electric signal. The image pickup device 22 has an A/D converting function.

In the present embodiment, a focus detection unit 23 performs focus detection using the image-plane phase-difference AF system, and hence the focus detection unit 23 calculates an amount of defocus based on, for example, focus detection information obtained from a digital image signal subjected to various types of compensation by an image processing unit 24 and outputs the calculated amount of defocus to a system control unit 50.

A shutter 101, which has a diaphragm function, shields the image pickup device 22 from light by closing when shooting is not performed, and guides a bundle of rays from a subject to the image pickup device 22 by opening when shooting is performed. The lens barrier 102 covers an image pickup system including the taking lens 103 to prevent the image pickup system including the taking lens 103, the shutter 101, and the image pickup device 22 from becoming soiled or breaking down.

The image processing unit 24 carries out a resizing process, such as predetermined pixel interpolation or reduction, and a color conversion process on data output from the image pickup device 22 or image data from the memory control unit 15. The image processing unit 24 also carries out a predetermined computation process using image data obtained by image taking, and the system control unit 50 controls exposure and distance measurement based on a result obtained by the computation process. As a result, an AE (auto exposure) process and an EF (auto flash level control and flash firing) process are carried out using a TTL (through-the-lens) system.

The image processing unit 24 also carries out the AF process using the image-plane phase-difference AF system with an image signal obtained from an image picked up by the image pickup device 22, and in addition, carries out an AWB (auto white balance) process using the TTL system based on a computation result obtained by a predetermined computation process.

Output data from the image pickup device 22 is directly written into a memory 32 via the image processing unit 24 and a memory control unit 15 or via the memory control unit 15. The memory 32 stores image data obtained and subjected to A/D conversion by the image pickup device 22 and image data to be displayed on the display unit 28. The memory 32 has a storage capacity large enough to store a predetermined number of still images and a predetermined period of moving images and sound for a predetermined time period. The memory 32 also has a memory (video memory) for displaying images.

A D/A converter 13 converts data, which is stored in the memory 32 and for display of an image, into an analog signal and supplies it to the display unit 28. Thus, image data for display written into the memory 32 is displayed on the display unit 28 via the D/A converter 13. The display unit 28 produces a display according to an analog signal supplied from the D/A converter 13. Digital signals subjected once to A/D conversion by the image pickup device 22 and accumulated in the memory 32 are converted into analog signals by the D/A converter 13 and successively transferred to the display unit 28, which in turn displays images. The display unit 28 thus acts as an electronic viewfinder to display through-the-lens images for use in deciding an angle of view or the like.

A nonvolatile memory 56 is an electrically erasable programmable memory such as a flash memory. Constants, programs, and so forth for operation of the system control unit 50 are stored in the nonvolatile memory 56. A RAM is used as a system memory 52. The system memory 52 expands constants, variables, programs, and so forth for operation of the system control unit 50, which are read out from the nonvolatile memory 56.

The system control unit 50 controls the entire camera 100. The system control unit 50 expands, for example, a program recorded in the nonvolatile memory 56 into the system memory 52 and carries out a predetermined process. The system control unit 50 also controls display by controlling the memory 32, the D/A converter 13, the display unit 28, and so forth. The system control unit 50 includes a system timer that is a clocking unit which measures time for use various types of control and time in a built-in clock.

The mode selector switch 60 switches an operation mode of the system control unit 50 to any of a still image recording mode, a moving image recording mode, a reproducing mode, and so forth. Examples of modes included in the still image recording mode include an auto shooting mode, an auto scene determination mode, a manual mode, a various scene mode in which shooting settings are configured according to shooting scenes, a program AE mode, and a custom mode.

The mode selector switch 60 enables switching directly to any of the above modes included in the still image recording mode. Alternatively, after being temporarily switched to the still image recording mode by the mode selector switch 60, the operation mode of the system control unit 50 may be switched to any of the above modes included in the still image recording mode using another operating member. Likewise, the moving image recording mode may include a plurality of modes.

A release switch (SW1) 62 is turned on halfway through operation of the release button 61, for example, by pressing the release button 61 halfway down. In response to an ON signal from the release switch 62, the system control unit 50 starts shooting preparations such as an AF (auto focusing) process, an AE (auto exposure) process, an AWB (auto white balance) process, and an EF (auto flash level control and firing) process.

A release switch (SW2) 64 is turned on by completing operation of the release button 61, for example, by pressing the release button 61 all the way down. In response to an ON signal from the release switch 64, the system control unit 50 starts a sequence of shooting operations from reading of a signal from the image pickup device 22 to writing of image data into the recording medium 200.

The operating unit 70 also serves as a variety of function buttons for use in selecting a variety of function icons displayed on the display unit 28. Examples of the function buttons include an end button, a back button, an image feed button, a jump button, a narrow-down button, and an attribute change button. For example, when a menu button is depressed, a menu screen on which various settings can be configured is displayed on the display unit 28. A user intuitively configures various settings using the menu screen displayed on the display unit 28 and a four-way key i.e. an up/down/right/left arrow key and a SET button.

An AF auxiliary light source 71 is caused to emit light to illuminate a subject when brightness is low. The controller wheel 73 as well as the four-way button is used to designate selection items. Rotating the controller wheel 73 generates an electronic pulse signal according to an amount of operation, and based on the electronic pulse signal, the system control unit 50 controls the component elements of the camera 100. Based on the electronic pulse signal, the system control unit 50 also determines an angle at which the controller wheel 73 was turned, the number of turns of the controller wheel 73, and so forth.

It should be noted that the controller wheel 73 should not particularly be limited but may be any operating member as long as its rotating operation can be detected. For example, the controller wheel 73 may be a dialing member which rotates to generate a pulse signal in response to a user's rotating operation. The controller wheel 73 may also be an operating member which is comprised of a touch sensor and does not rotate and on which, for example, a user's finger rotating operation is detected.

A power source control unit 80 is comprised of a battery detecting circuit, a DC-DC converter, a switch circuit, which switches blocks through which electric current is passed, and so forth and detects the presence or absence of a battery mounted, a battery type, and a remaining battery level. Based results of the detection and an instruction from the system control unit 50, the power source control unit 80 controls the DC-DC converter and supplies required voltage to the component elements including the recording medium 200 for a required period of time. A power source unit 40 is comprised of a primary battery such as an alkali battery or a lithium battery, a secondary battery such as a NiCd battery, a NiMH battery, or a Li battery, an AC adapter, and so forth. A recording medium I/F 18 is an interface to the recording medium 200 such as a memory card. The camera 100 is further equipped with a strobe 90.

Figure 3:
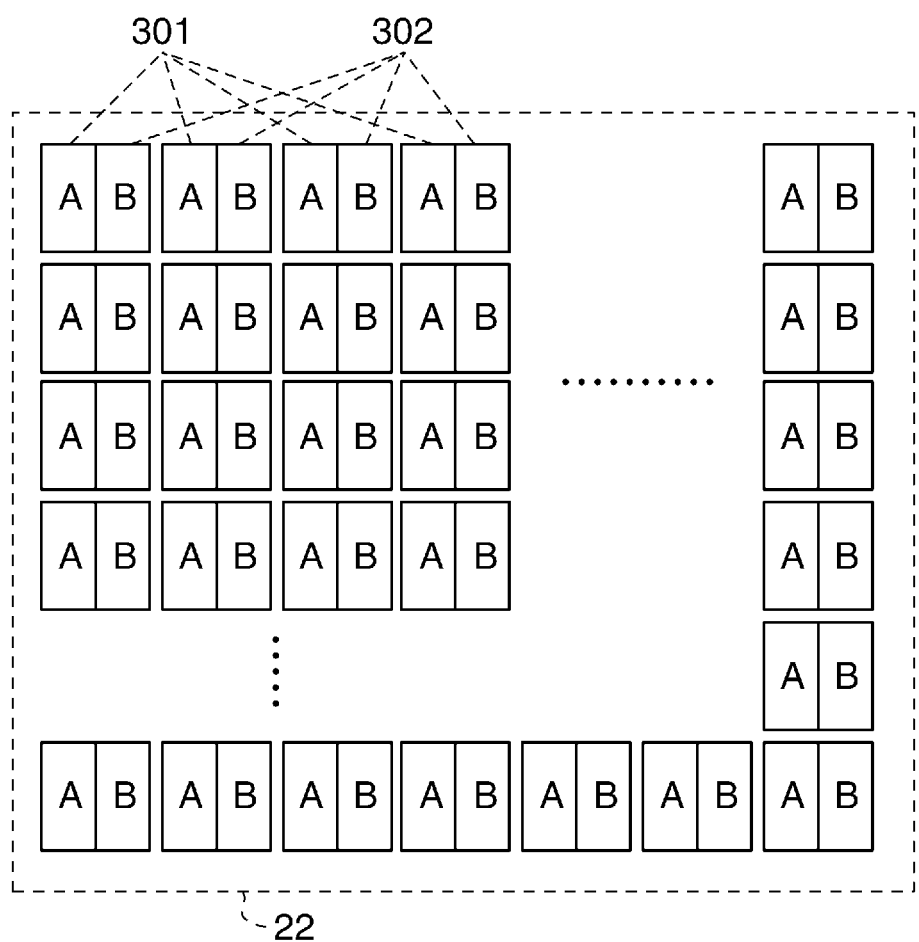
FIG. 3 is diagram schematically showing how pixels of an image pickup device are arranged.

FIG. 3 is diagram schematically showing a pixel layout of the image pickup device 22. As shown in FIG. 3, the image pickup device 22 is constructed such that a plurality of pupil-dividing pixels is arranged in rows and columns in a two-dimensional form, and each pupil-dividing pixel has a plurality of split pixels (photoelectrical conversion units) each comprised of an FD (photodiode). The system control unit 50 controls the image processing unit 24 to generate a focus detection signal using an A signal 301 and a B signal 302 read out from the split pixels A and B, respectively, and perform image-plane phase-difference AF based on the generated focus detection signal.

A description will now be given of a sequence in which signals are read out using a conventional method. First, only the A signal 301 is read out from one split pixel of the pupil-dividing pixel of the image pickup device 22, and second, an A+B signal which a sum of the A signal 301 and the B signal 302 in the image pickup device 22 is read out. Then, the A signal 301 is subtracted from the A+B signal to obtain the B signal.

Figure 4:
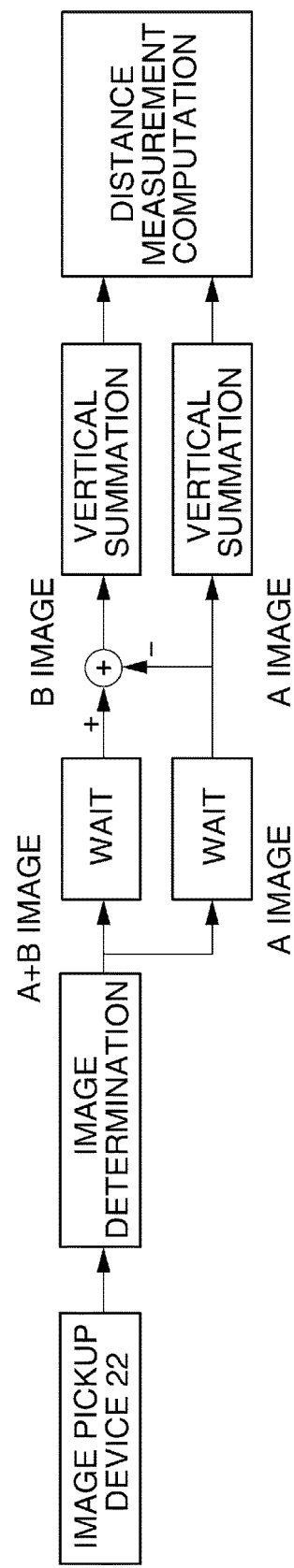
FIG. 4 is a block diagram useful in explaining a process in which an image read out from pupil-dividing pixels of the image pickup device using a conventional readout method is reconstructed.

FIG. 4 is a block diagram useful in explaining an image reconstruction process using the A signal, the B signal, and the A+B signal read out from the pupil-dividing pixel of the image pickup device 22 using the conventional readout method described above with reference to FIG. 3. It should be noted that in the following description, the A signal, the B signal, and the A+B signal are referred to as the A image, the B image, and the A+B image for the sake of convenience. It should also be noted that this process is carried out by the image processing unit 24 under the control of the system control unit 50.

First, the A image is read out from the pupil-dividing pixel of the image pickup device 22, and next, the A+B image which is a sum of the A image and the B image is read out. Then, an image determination block sorts the A image and the A+B image by determining whether an image that has been read out is the A image or the A+B image. Here, since the A image is read out first, and then the A+B image which is a sum of the A image and the B image is read out, waiting circuits make processing timings equal so as to synchronize processes, and when both images are obtained, the A image is subtracted from the A+B image to obtain the B image. Then, after the A image and the B image are separated, each image is subjected to vertical summation which is a compensation process, and a resultant image is output to a distance measurement computation block.

At this time, subtracting the B image from the A+B image would deteriorate a signal-to-noise ratio by 3 db in theory. Thus, in the present embodiment, generation of a noise difference in phase difference information is prevented in a manner described below.

Figure 5:
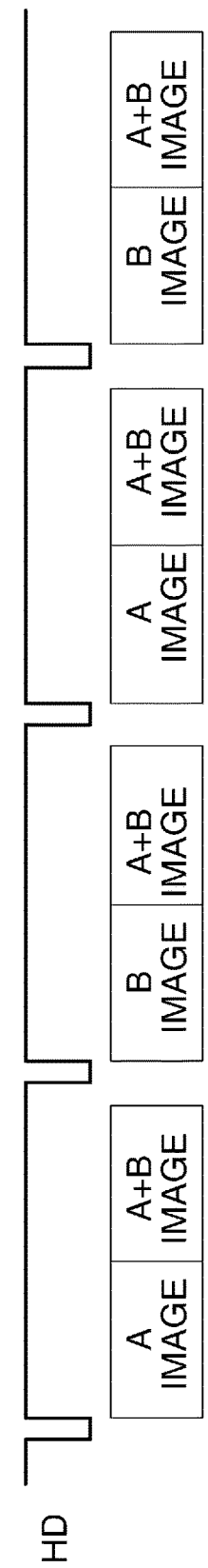
FIG. 5 is a timing chart showing timings of image readout from the pupil-dividing pixels of the image pickup device according to the present embodiment.

FIG. 5 is a timing chart showing readout timings of the A image, the B image, and the A+B image from the pupil-dividing pixel of the image pickup device 22. Referring to FIG. 5, first, in accordance with horizontal synchronizing signal HD timing, the A image is read out from one split pixel of the pupil-dividing pixel, and then the A+B image obtained by adding the A image and the B image together is read out. In accordance with next horizontal synchronizing signal HD timing, with the readout sequence reversed, the B image is read out from the other split pixel of the pupil-dividing pixel, and then the A+B image is read out.

This is alternately repeated on a row-by-row basis, and vertical summation is performed in the column direction to make noise levels of the A image and the B image equal. Here, the A image corresponds to an exemplary first image signal of the present invention, the B image corresponds to an exemplary second image signal of the present invention, and the A+B image corresponds to an exemplary third image signal of the present invention.

Figure 6:
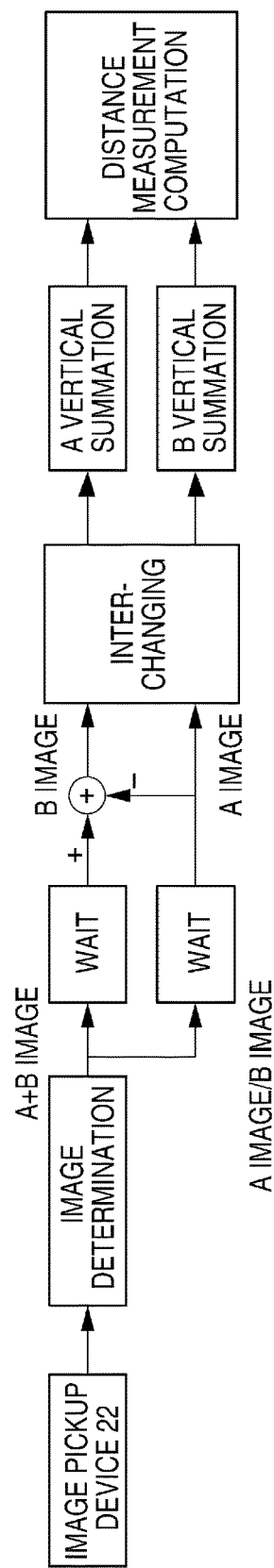
FIG. 6 is a block diagram useful in explaining a process in which an image read out from the pupil-dividing pixels of the image pickup device using a readout method according to the present embodiment is reconstructed.

FIG. 6 is a block diagram useful in explaining an image reconstruction process using the A image, the B image, and the A+B image read out from the pupil-dividing pixel of the image pickup device 22 using the readout method according to the present embodiment described above with reference to FIG. 5. The process in FIG. 6 is carried out by the system control unit 50 controlling the image processing unit 24 in accordance with a program recorded in, for example, the nonvolatile memory 56 and expanded into the system memory 52.

In the present embodiment, the order in which the A image and the B image are read out is switched on a row-by-row basis, and hence the way of reconstructing an image varies with rows. For this reason, inputs to two vertical summation circuits need to be interchanged.

First, the image determination block sorts the A image, the B image, or the A+B image by determining whether an image that has been read out from the image pickup device 22 is the A image, the B image, and the A+B image. Next, as with FIG. 4, the waiting circuits make processing timings equal so as to synchronize processes, and when all the images are obtained, the A image and the B image are subtracted from the A+B image to obtain the separated A image and the separated B image. Here, the separated A image corresponds to an exemplary first separated image signal of the present invention, and the separated B image corresponds to an exemplary second separated image signal of the present invention.

As described above, the order in which the A image and the B image are read out is switched on a row-by-row basis. For this reason, when the A image is read out first, the interchanging block does not perform interchanging, but when the B image is read out first, the interchanging block interchanges the input images and outputs them to the A vertical summation circuit and the B vertical summation circuit, respectively. The A image and the B image need to be corrected in different correction patterns since the A image and the B image are different in output characteristics.

When noise levels are looked at on a row-by-row basis, they are different, but after that, the vertical summation circuit adds images with different noise levels together in the column direction. As a result, the distance measurement computation circuit generates a pair of focus detection signals with noise levels of the A image and the B image being equal. The generated pair of focus detection signals is output to the focus detection circuit 23.

Figures 7, 8:
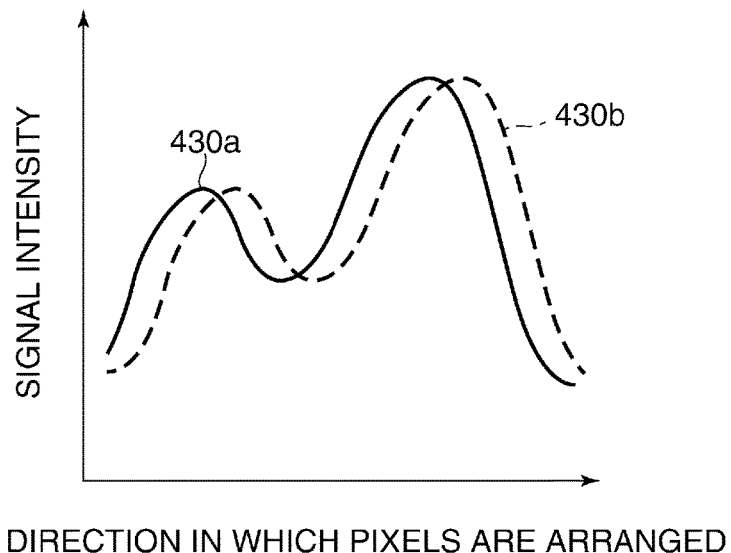
FIG. 7 is a graph showing a pair of focus detection signals output from an image processing unit to a focus detection unit.
FIG. 8 is a diagram showing conditions for alternately switching orders in which images are read out from pupil-dividing pixels.

FIG. 7 is a graph showing a pair of focus detection signals output from the image processing unit 24 to the focus detection unit 23 after the image processing unit 24 makes the variety of corrections described above. In FIG. 7, the horizontal axis indicates a direction in which pixels of concatenated signals are arranged, and the vertical axis indicates signal intensities.

The taking lens 103 is out of focus with respect to the image pickup device 22, and hence as shown in FIG. 7, a focus detection signal 430a is shifted to a left side, and a focus detection signal 430a is shifted to a right side. By calculating an amount by which the focus detection signals 430a and 430b are shifted as an amount of defocus by means of well-known correlated computations or the like using the focus detection unit 23, a degree to which the taking lens 103 is out of focus is found.

The system control unit 50 then calculates an amount by which the focus lens is driven based on the lens positional information on the taking lens 103 and the amount of defocus obtained from the focus detection unit 23. After that, based on the positional information on the focus lens, the system control unit 50 sends information on a position to which the taking lens 103 should be driven to a lens drive circuit, not shown. As a result, the taking lens 103 is driven in a direction of an optical axis to attain focus.

FIG. 8 is a diagram showing conditions for alternately switching the order in which the A image and the B image are read out on a row-by-row basis. Alternatively switching the order in which the A image and the B image are read out on a row-by-row basis may change output of fixed pattern noise. For this reason, the way of switching the order in which the A image and the B image are read out is changed according to an ISO sensitivity and a temperature at the time of shooting.

In a low-ISO-sensitivity and low-temperature environment, there is only a small amount of random noise, and changes in fixed pattern noise tend to manifest themselves, and therefore, it is preferable that the order in which the A image and the B image are read out is not switched. As the ISO sensitivity increases, the number of rows for which summation is performed by the vertical summation circuit is decreased, and at a high ISO sensitivity (for example, ISO 1600), fixed pattern noise becomes inconspicuous because it is buried in random noise, and hence the order is switched on a row-by-row basis. The amount of random noise varies with temperature as well, and hence at low temperatures, the frequency with which the order in which the A image and the B image are read out is switched is minimized, and at high temperatures, the switching of the order is performed with increased frequency.

Figure 9:
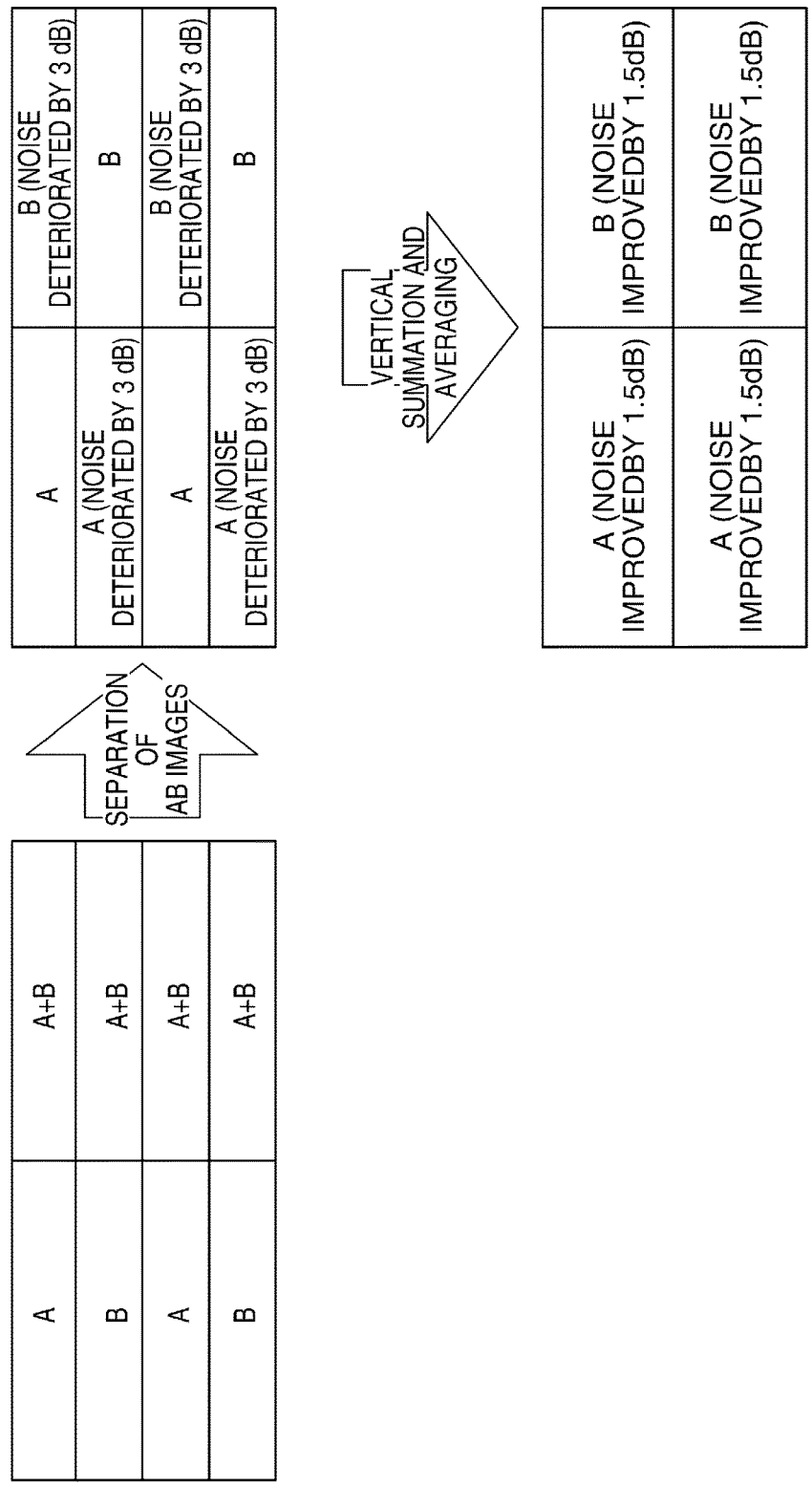
FIG. 9 is a diagram useful in explaining orders in which images are read out from the pupil-dividing pixels and the amount of noise in images obtained by subtraction.

FIG. 9 is a diagram useful in explaining the order in which the A image and the B image are read out from the image pickup device 22 and the amount of noise in the A image and the B image obtained by subtraction.

In the example shown in FIG. 9, the order in which the A image and the B image are read out from the image pickup device 22 is alternately switched on a row-by-row basis. Separating the A image and the B image after reading out them from the image pickup device 22 deteriorates noise in the image obtained by subtraction by 3 db. A situation in which in the first row, noise in the B image is deteriorated by 3 db, and in the next row, noise in the A image is deteriorated by 3 db is repeated.

By subjecting them to vertical averaging every two rows, and further, performing vertical summation for a plurality of rows, the noise levels of the A image and the B image become equal, eliminating the need to unnecessarily perform vertical summation. It should be noted that the number of rows subjected to vertical summation should be an optimum number with consideration given to not only ISO sensitivity but also temperature and shutter speed. Moreover, the order in which the A image and the B image are read out may be alternately switched every two or more rows. In the rows subjected to vertical summation, if the number of times of individual readout is the same, the same effects as those of the present embodiment would be obtained.

As described above, in the present embodiment, when the image-plane phase-difference AF is to be performed, the amounts of noise in two phase difference signals are made equal to improve AF performance even in a low-brightness scene. Moreover, since the number of rows subjected to summation is reduced, it is possible to make an AF frame small and thus bring even a small subject into focus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-149848, filed Jul. 29, 2016 which is hereby incorporated by reference herein in its entirety.

What is claimed is:

1. An image pickup apparatus comprising:
an image pickup device configured to comprise a plurality of pupil-dividing pixels arranged in rows and columns in a two-dimensional form;
a readout unit configured to read out a first image signal from one pixel of each of the pupil-dividing pixel, read out a second image signal from the other pixel, and read out a third image signal obtained by adding the first image signal and the second image signal by the image pickup device;
a switching unit configured to alternately switch, on a row-by-row basis, an order in which the first image signal and the second image signal are read out by the readout unit;
a subtraction unit configured to subtract each of the first image signal and the second image signal from the third image signal to obtain a first separated image signal and a second separated image signal, respectively, separated from the third image signal; and
a summation unit configured to add the first image signal read out by the readout unit and the first separated image signal obtained by the subtraction unit together in the column direction and add the second image signal read out by the readout unit and the second separated image signal obtained by the subtraction unit together in the column direction.

2. The image pickup apparatus according to claim 1, further comprising:
a computation unit configured to generate a pair of focus detection signals by performing a computation based on image signals obtained as a result of the summation by the summation unit; and
a focusing unit configured to perform a focusing operation by driving a focus lens based on an amount of defocus calculated using the pair of focus detection signals.

3. The image pickup apparatus according to claim 1, wherein according to an ISO sensitivity at a time of shooting, the switching unit changes the number of rows by which an order in which the first image signal and the second image signal are read out by the readout unit.

4. The image pickup apparatus according to claim 1, wherein according to a temperature at a time of shooting, the switching unit changes the number of rows by which an order in which the first image signal and the second image signal are read out by the readout unit.

5. The image pickup apparatus according to claim 1, wherein according to a shutter speed at a time of shooting, the switching unit changes the number of rows by which an order in which the first image signal and the second image signal are read out by the readout unit.

6. The image pickup apparatus according to claim 1, wherein according to the number of rows by which an order in which the first image signal and the second image signal are read out by the readout unit, the summation unit changes the number of rows in which the first separated image signal and the second separated image signal are added together in the column direction.

7. A control method for an image pickup apparatus equipped with an image pickup device that has a plurality of pupil-dividing pixels arranged in rows and columns in a two-dimensional form, comprising:
a readout step of reading out a first image signal from one pixel of each of the pupil-dividing pixel, reading out a second image signal from the other pixel, and reading out a third image signal obtained by adding the first image signal and the second image signal by the image pickup device;
a switching step of alternately switching, on a row-by-row basis, an order in which the first image signal and the second image signal are read out in the readout step;
a subtraction step of subtracting each of the first image signal and the second image signal from the third image signal to obtain a first separated image signal and a second separated image signal, respectively, separated from the third image signal; and
a summation step of adding the first image signal read out in the readout step and the first separated image signal obtained in the subtraction step together in the column direction and adding the second image signal read out in the readout step and the second separated image signal obtained in the subtraction step together in the column direction.

8. A non-transitory computer-readable storage medium storing a program for causing a computer to execute steps of a control method for an image pickup apparatus equipped with an image pickup device that has a plurality of pupil-dividing pixels arranged in rows and columns in a two-dimensional form, the control method comprising:
a readout step of reading out a first image signal from one pixel of each of the pupil-dividing pixel, reading out a second image signal from the other pixel, and reading out a third image signal obtained by adding the first image signal and the second image signal by the image pickup device;
a switching step of alternately switching, on a row-by-row basis, an order in which the first image signal and the second image signal are read out in the readout step;
a subtraction step of subtracting each of the first image signal and the second image signal from the third image signal to obtain a first separated image signal and a second separated image signal, respectively, separated from the third image signal; and
a summation step of adding the first image signal read out in the readout step and the first separated image signal obtained in the subtraction step together in the column direction and adding the second image signal read out in the readout step and the second separated image signal obtained in the subtraction step together in the column direction.

* * * * *